July 18, 1967   J. R. WILLIAMS   3,331,484
ABRASION RESISTANT DRAG-TYPE FEED CHAIN
Filed Feb. 21, 1966   2 Sheets-Sheet 1

INVENTOR.
JOHN R. WILLIAMS
BY
ATTORNEY

July 18, 1967  J. R. WILLIAMS  3,331,484
ABRASION RESISTANT DRAG-TYPE FEED CHAIN
Filed Feb. 21, 1966  2 Sheets-Sheet 2
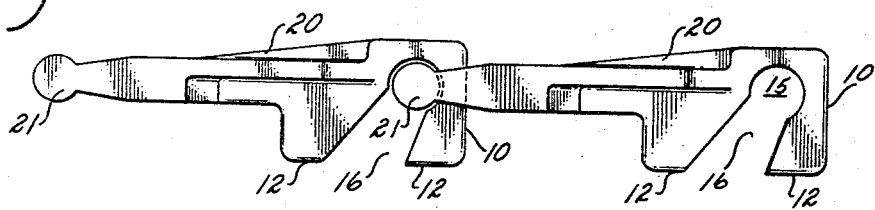
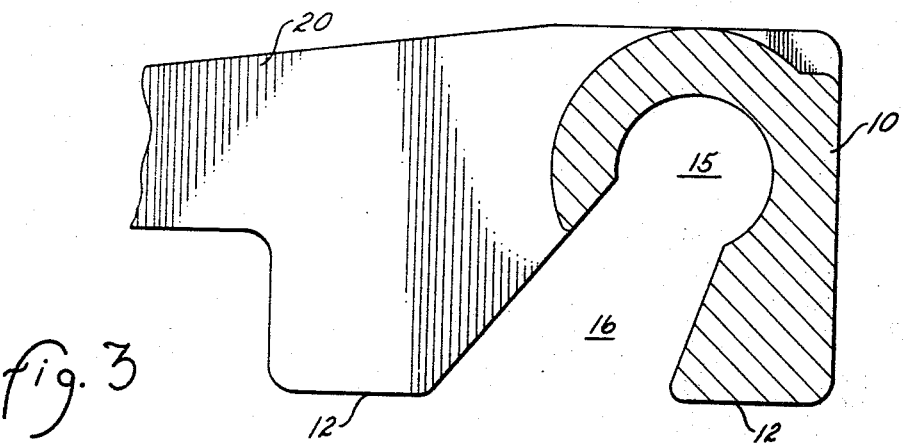
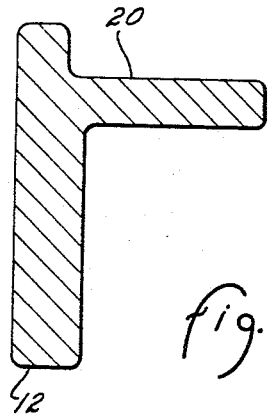
INVENTOR.
JOHN R. WILLIAMS
BY
ATTORNEY

United States Patent Office 3,331,484
Patented July 18, 1967

3,331,484
ABRASION RESISTANT DRAG-TYPE FEED CHAIN
John R. Williams, 924 W. McLellan Road, Mesa, Ariz. 85201
Filed Feb. 21, 1966, Ser. No. 529,084
4 Claims. (Cl. 198—1)

This invention relates to drag-type feed chains, such chains being commonly employed in feeding comminuted materials to processing vessels in chemical, metallurgical, and other processing industries.

In a particular aspect, the invention concerns drag chains which are especially adapted to resist abrasion.

In a further aspect, the invention concerns abrasion resistant drag chains which are particularly suited for operation in a high-temperature, corrosive environment.

In many industries it is necessary to feed granular or comminuted materials to processing vessels such as furnaces, reactors, and the like. Sometimes it is possible to feed these materials to such equipment by means of screw conveyors, belts, and other conventional solids-handling apparatus. However, in certain instances, particularly where the solid material is highly abrasive and also where high operating temperatures and corrosive atmospheres are encountered, it is necessary to employ so-called "drag chains." Such drag chains are typically endless belts formed by interconnecting metal links which are specially constructed to withstand the severe conditions encountered. For example, such drag chains are commonly employed to feed concentrates or calcined ores to the reverberatory furnaces in copper smelters. Such reverberatory furnaces are large, stationary, box-like structures constructed of refractory brick. A fuel such as natural gas, powdered coal, or the like, is fed into one end of the furnace along with an appropriate quantity of combustion air. Combustion of the fuel occurs within the furnace and the heat generated thereby is reflected downwardly to melt the solid materials. The melting and various flexing operations separate the solid materials into waste slag material and valuable enriched copper-containing material called "matte." In this reverberatory smelting process, large quantities of corrosive gas, principally sulfur dioxide, is liberated from the solid material and passes off as a gas along with the combustion products.

The dry materials, either concentrate or calcined ore, are charged to the reverberatory furnace in a modern copper smelter by means of relatively small ports located in the ceiling of the furnace. These ports are spaced along the sides of the furnace at appropriate locations to form piles of the solid material along the walls of the furnace. These piles melt at their base and are continually replenished by the addition of further solid material at the top of the pile. Drag chains are employed to transport the solid materials from their storage point along channels to the feeding ports in the ceiling of the furnace. The drag chains are almost constantly subjected to the very corrosive gases produced in the furnace and are further subjected to high temperatures from the furnace itself and from the hot solid materials being fed to the furnace. This combination of corrosive atmosphere, high temperature, and abrasive material being handled presents a serious maintenance problem, necessitating frequent repair and replacement of the drag chain.

Accordingly, it would be highly desirable to provide a drag chain which is especially adapted to withstand the severe operating conditions encountered in feeding abrasive materials to various pieces of processing equipment. It is further highly desired to provide a drag chain which is capable of feeding abrasive solid materials under severe environmental conditions such as the high temperature and corrosive atmosphere encountered in the vicinity of the feeding ports of a reverberatory furnace in a modern copper smelter. It is further desired to provide a drag chain for handling abrasive solids in a corrosive, high-temperature environment which is especially adapted to resist these severe environmental conditions and which requires less frequent maintenance and replacement.

Accordingly, it is a principal object of the present invention to provide a drag chain for feeding abrasive materials to processing apparatus;

It is another object of the invention to provide such a drag chain which will withstand severe environmental conditions to a degree not possible in the drag chains of the prior art;

Yet another object of the invention is the provision of a drag chain which is especially adapted to feeding hot solid material such as calcined ore to the reverberatory furnace in a copper smelter;

A still further object of the invention is the provision of a drag chain for feeding a copper reverberatory furnace which is adapted to resist clogging by the hot solid materials;

Yet another object of the invention is the provision of a drag chain which can be readily repaired, or replaced, with a minimum of down time;

Another object of the invention is the provision of a drag chain composed of links which are connected by means other than the separate pin and pin bearing of the chains of the prior art;

Yet another object of the invention is the provision of a novel, one-piece link for a drag chain which may be manufactured by making a single casting;

These and other further and more specific objects and advantages of the present invention will be apparent from the following detailed description thereof and the accompanying drawings.

Briefly, in accordance with one embodiment of the present invention, a drag chain is provided utilizing a plurality of links, each link being formed of a single casting and adapted to be connected to other links without the expediency of the heretofore necessary pin structure. A materials pushing surface is provided extending substantialy perpendicular to a supporting surface and also extending from an abrasion surface which supports the link out of contact with the supporting surface. The abrasion surface permits the linking bar journal to be supported in such a manner to avoid the accumulation of an undue proportion of abrasive particles while nevertheless permitting the link to be used over an extensive period of time without the wear incurred by the link interfering with the operation of the journal. A connecting bar is cast integral with support arms extending from the journal rearwardly; the support arms are positioned above the supporting surface by the abrasion surface and are therefore prevented from the usual wear that causes weakening of the link.

The present invention may best be described by reference to the accompanying drawings in which:

FIGURE 3 is a cross-sectional view of FIGURE 1 taken along line 3—3;

FIGURE 4 is a cross-sectional view of FIGURE 2 taken along line 4—4;

FIGURE 5 is a side elevational view of two links constructed in accordance with the teachings of the present invention and showing the manner in which the links are joined to form a continuous drag chain.

Figure 1:
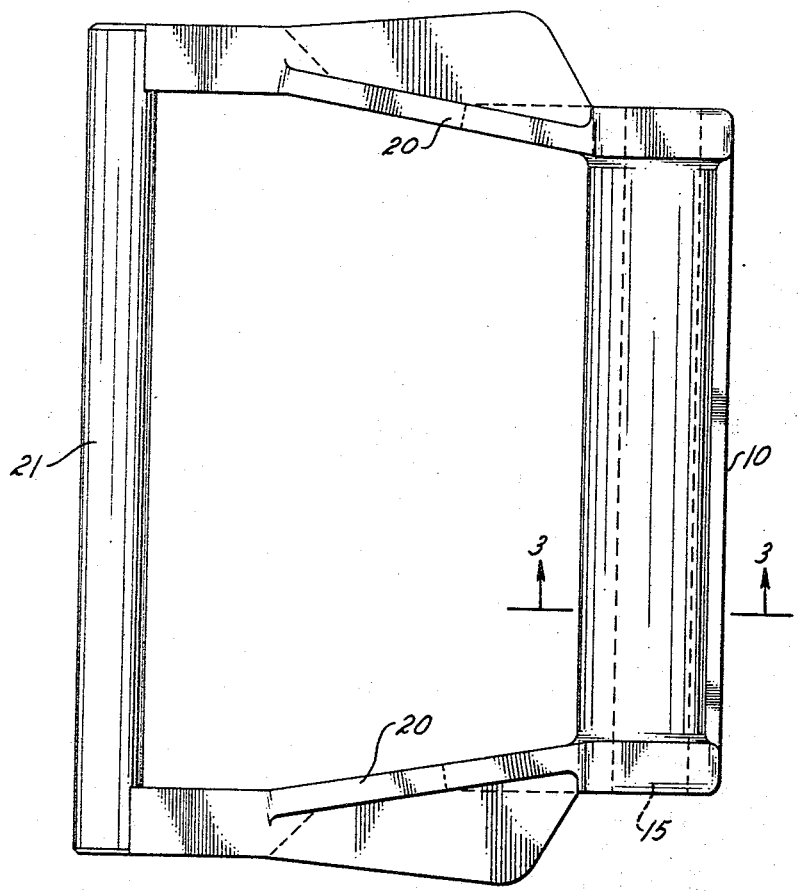
FIGURE 1 is a plan view of a link of a drag chain constructed in accordance with the teachings of the present invention.
Figure 2:
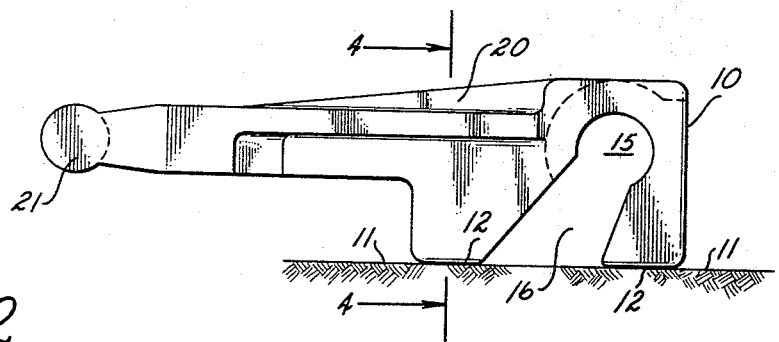
FIGURE 2 is a side elevational view of FIGURE 1.

Referring to the drawings, each of the links of the drag chain of the present invention includes a pushing surface 10 that extends upwardly and substantially perpendicular to a drag chain supporting surface 11. An abrasion surface 12 contacts the supporting surface 11 and performs many functions, the two most important of which are the provision of a means for elevating the remaining parts of the link from the supporting surface to thereby avoid abrasional wear thereof, and the other of which is the provision of a means for providing increased abrasion life of the link through the addition of materials at the point of greatest wear. The materials pushing surface 10 extends upwardly a greater distance than would normally be available if the extensive abrasion surface were not provided with its capacity for elevating the link above the supporting surface 11.

A connecting bar journal 15 is formed having an axis substantially parallel to the supporting surface 11 and parallel to the materials pushing surface 10. A slot 16 extends upwardly from the abrasion surface 12 to the connecting bar journal 15. The slot 16 is tapered inwardly as it approaches the journal 15 to provide a means for guiding a connecting bar into the journal as well as providing an escape from the journal for abrasive particles entrapped therein. The slot 16 is also tilted backwardly in relation to the materials pushing surface to prevent the accumulation of abrasive particles and to provide a self-locking force between successive links, thereby preventing the links from becoming disengaged. A pair of support arms 20 extend rearwardly from the materials pushing surface and also extend outwardly and terminate in an integral connecting bar 21 which joins the two support arms. The connecting bar 21 is so dimensioned that it is readily journaled in the connecting bar journal 15 of the adjacent drag chain link. It will be noted that the entire link is formed from a single casting and that the connecting bar forms a solid supporting structure between the two support arms. It may also be noted that the connecting bar and the support arms are supported out of contact with the supporting surface 11, thereby preventing the abrasive wear of the critical parts of the link. The distance to the longitudinal axis of the connecting bar 21 or the longitudinal axis of the connecting bar journal 15 from the abrasion surface 12 is greater than one-half of the height of the materials pushing surface 10 to accomplish the elevation of the connecting bar and connecting bar journal.

The structure thus provided by the present invention is less expensively manufactured through the utilization of a single casting without the previously expensive provision of a separate pin and pin bearing. The connecting bar is dimensioned to loosely fit within the journal of the adjacent link while the links are rapidly and effectively joined through the expedient of inserting a connecting bar of one link through the journal slot and into the journal of an adjacent link. The links may then rapidly be replaced or removed for repair without time-consuming, and sometimes destructive, disassembly of a pin structure. The abrasion surface permits longer life by adding material at the point of greatest wear while further increasing life by elevating the critical portions of the link out of contact with the supporting surface. The utilization of an abrasion surface for supporting the remainder of the link out of contact with the supporting surface also yields the advantage of providing a materials pushing surface that may be formed substantially perpendicular to the supporting surface to thereby provide a more effective meeting structure and therefore a more effective drag chain.

The novel links hereabove described are manufactured of a suitable corrosion-resistant metal or alloy material; for example, stainless steel or the like. The specific metal or alloy to be employed will vary somewhat in accordance with the nature of the corrosion conditions encountered and, to some extent, will be determined by the operating temperature conditions. In a preferred embodiment of the invention, a chain such as described hereabove for feeding hot calcined ore to a copper reverberatory furnace is constructed of so-called "HK" high chrome stainless steel. Type 8630 alloy is a preferred material for use in feeding copper concentrates which are somewhat cooler when fed to the furnace.

Having fully described my invention and the presently preferred embodiments thereof, I claim:

1. A drag chain for operation in abrasive surroundings comprising a plurality of links, each link comprising: a substantially flat continuous materials pushing surface extending upwardly from a drag chain supporting surface, an abrasion surface in contact with said supporting surface and joining said pushing surface, a connecting bar journal extending substantially parallel to and rearwardly of said abrasion surface, a journal slot extending upwardly from said abrasion surface to said connecting bar journal for receiving and guiding a connecting bar into said journal, said slot tilted rearwardly to prevent accumulation of abrasive materials, means comprising support arms extending rearwardly from said pushing surface out of contact with said supporting surface, and a connecting bar formed integral with said support arms, said bar having a length greater than the length of said connecting bar journal, the distance to the longitudinal axis of said connecting bar journal from said abrasion surface being greater than one-half of the height of said materials ular thereto.

2. The drag chain defined in claim 1 wherein said materials pushing surface extends upwardly from a drag chain supporting surface and is substantially perpendicular thereto.

3. The drag chain defined in claim 1 wherein said journal slot is tapered to become narrower as the distance from the abrasion surface becomes greater.

4. A drag chain as defined in claim 3 wherein said support arms are substantially parallel to each other and to said supporting surface, and wherein said connecting bar has a cylindrical cross section.

References Cited

UNITED STATES PATENTS

| | | | |
|---|---|---|---|
| 573,988 | 12/1896 | Levalley | 198—189 |
| 3,160,024 | 12/1964 | Mojonnier | 198—189 |

EVON C. BLUNK, *Primary Examiner.*

RICHARD E. AEGERTER, *Assistant Examiner.*